(12) United States Patent
Lee et al.

(10) Patent No.: US 11,283,294 B2
(45) Date of Patent: Mar. 22, 2022

(54) WIRELESS CHARGING FOR RECHARGEABLE BUTTON CELL BATTERY

(71) Applicant: Nano and Advanced Materials Institute Limited, Hong Kong (HK)

(72) Inventors: Cheuk Yin Lee, Hong Kong (HK); Shengbo Lu, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 170 days.

(21) Appl. No.: 16/733,368

(22) Filed: Jan. 3, 2020

(65) Prior Publication Data
US 2020/0144860 A1 May 7, 2020

Related U.S. Application Data

(63) Continuation-in-part of application No. 16/407,207, filed on May 9, 2019, now Pat. No. 10,971,945, (Continued)

(51) Int. Cl.
*H01M 10/0525* (2010.01)
*H02J 50/10* (2016.01)
(Continued)

(52) U.S. Cl.
CPC .............. *H02J 50/10* (2016.02); *H01F 38/14* (2013.01); *H01M 10/0427* (2013.01); *H01M 10/0525* (2013.01); *H01M 10/46* (2013.01); *H02J 7/00302* (2020.01); *H02J 7/00304* (2020.01); *H02J 7/00306* (2020.01); *H02J 7/06* (2013.01); *H01M 2220/30* (2013.01)

(58) Field of Classification Search
CPC ......... H01F 2027/2809; H01F 27/2804; H01F 38/14; H01M 10/0427; H01M 10/0525; H01M 10/46; H01M 2220/30; H02J 50/10; H02J 7/00302; H02J 7/00304; H02J 7/00306; H02J 7/0031; H02J 7/06; Y02E 60/10; Y02P 70/50
See application file for complete search history.

(56) References Cited

U.S. PATENT DOCUMENTS

| | | | |
|---|---|---|---|
| 6,265,100 B1 * | 7/2001 | Saaski | H04R 25/602 429/163 |
| 2016/0105042 A1 * | 4/2016 | Taylor | H01M 10/441 320/134 |

(Continued)

*Primary Examiner* — Victoria H Lynch
(74) *Attorney, Agent, or Firm* — Idea Intellectual Limited; Margaret A. Burke; Sam T. Yip

(57) ABSTRACT

The present invention provides a charging device for a button/coin cell rechargeable lithium ion battery. A receiving inductor coil receives energy from a transmitting inductor coil which is passed to a wireless charging receiving circuit which is in electrical communication with the receiving inductor coil. The wireless charging receiving circuit communicates with a charging control circuit, a voltage regulation circuit, and a battery protection circuit in electrical communication with one another. The voltage regulation circuit includes a 1.8 V to 3.3 V constant voltage output regulator circuit to maintain a constant voltage output in loading currents ranging from approximately 10 μA to approximately 300 mA.

11 Claims, 13 Drawing Sheets

Related U.S. Application Data which is a continuation-in-part of application No. 15/924,299, filed on Mar. 19, 2018, now Pat. No. 10,490,843.

(60) Provisional application No. 62/788,149, filed on Jan. 4, 2019, provisional application No. 62/673,141, filed on May 18, 2018, provisional application No. 62/602,010, filed on Apr. 10, 2017.

(51) Int. Cl.
    *H02J 7/06* (2006.01)
    *H01F 38/14* (2006.01)
    *H02J 7/00* (2006.01)
    *H01M 10/04* (2006.01)
    *H01M 10/46* (2006.01)

(56) References Cited

U.S. PATENT DOCUMENTS

| | | | |
|---|---|---|---|
| 2016/0172104 A1* | 6/2016 | Mirbozorgi | H02J 50/12 |
| | | | 320/108 |
| 2016/0268645 A1* | 9/2016 | Koebler | H01M 50/20 |
| 2017/0195804 A1* | 7/2017 | Sandhu | H01M 10/486 |
| 2019/0131814 A1* | 5/2019 | Robbins | H02J 7/0029 |
| 2020/0021127 A1* | 1/2020 | Itagaki | H01F 38/14 |

* cited by examiner

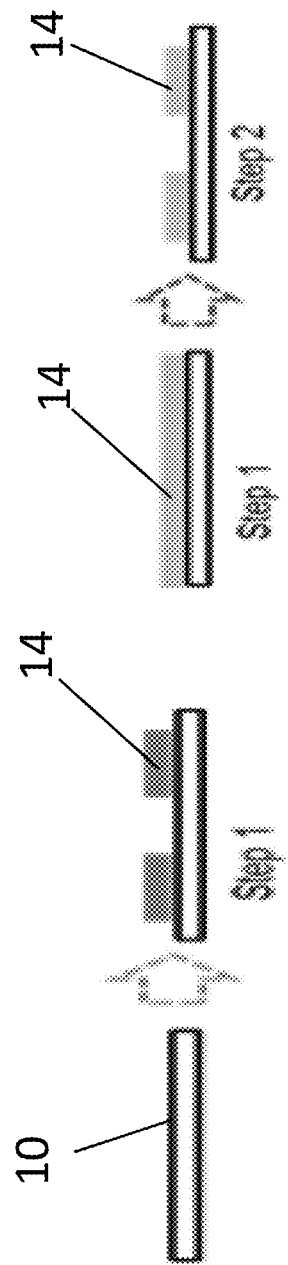
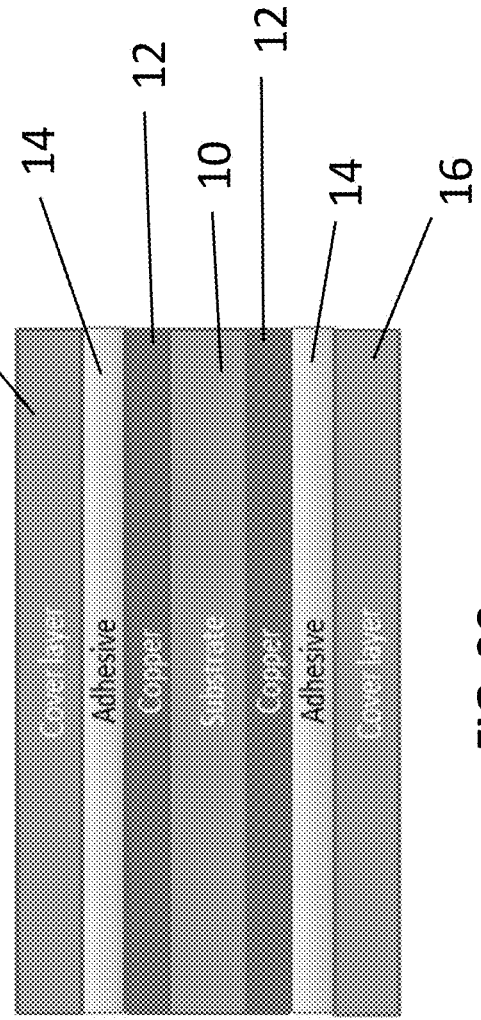
FIG. 9A
FIG. 9B
FIG. 9C

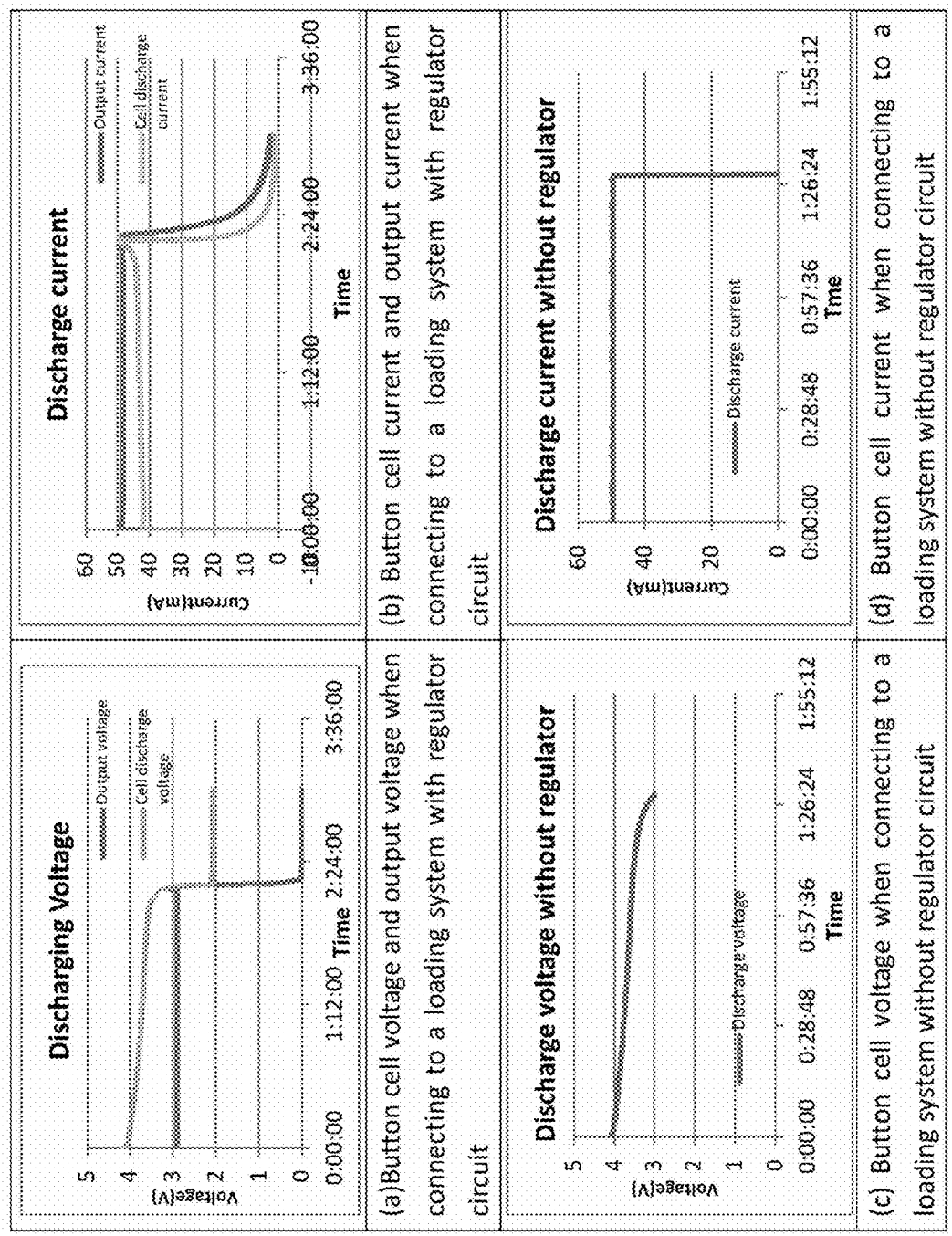

FIG. 13D (a) Button cell voltage and output voltage when connecting to a loading system with regulator circuit (b) Button cell current and output current when connecting to a loading system with regulator circuit (c) Button cell voltage when connecting to a loading system without regulator circuit (d) Button cell current when connecting to a loading system without regulator circuit

WIRELESS CHARGING FOR RECHARGEABLE BUTTON CELL BATTERY

CROSS-REFERENCE TO RELATED APPLICATIONS

This application claims priority to U.S. Provisional Patent Application Ser. No. 62/788,149 filed Jan. 4, 2019, and is a continuation-in-part of U.S. patent application Ser. No. 16/407,207 filed May 9, 2019, which is a continuation-in-part of U.S. patent application Ser. No. 15/924,299 filed Mar. 19, 2018 (issued under U.S. Pat. No. 10,490,843 on Nov. 26, 2019), which claims priority to U.S. Provisional Patent Application Ser. No. 62/602,010 filed Apr. 10, 2017, all of the disclosures of which are incorporated by reference herein.

FIELD OF THE INVENTION

The invention relates to wireless charging and, more particularly, to wireless charging for button/coin cell rechargeable batteries used in portable electronic devices.

BACKGROUND

Wireless charging of batteries for a variety of portable electronic devices has become increasing popular. In inductive wireless charging, the battery within a device is powered through a pair of inductive coils. The transmitter coil is typically powered by an AC adapter or USB port. The receiving coil charges the battery, typically while the battery is still positioned within the electronic device. Advantageously, the receiving battery may remain sealed within the device and the device itself may be made waterproof or water resistant. However, the existing wireless charging solutions are not satisfactory for small electronics such as wearable devices and computer peripherals that use small form factor batteries, such as rechargeable lithium ion batteries having a button cell/coin cell configuration. As these batteries are used in numerous portable devices, there is a need in the art for improved wireless charging for button cell batteries.

SUMMARY OF THE INVENTION

The present invention provides a charging device for a button/coin cell rechargeable lithium ion battery. A receiving inductor coil receives energy from a transmitting inductor coil which is passed to a wireless charging receiving circuit which is in electrical communication with the receiving inductor coil. The wireless charging receiving circuit communicates with a charging control circuit, a voltage regulation circuit, and a battery protection circuit in electrical communication with one another. The voltage regulation circuit includes a 1.8 V to 3.3 V constant voltage output regulator circuit to maintain a constant voltage output in loading currents ranging from approximately 10 μA to approximately 300 mA.

BRIEF DESCRIPTION OF THE DRAWINGS

FIGS. 9A-9C depict fabrication and layer structures for circuits in the wireless charging device of FIG. 1;

FIGS. 13A-13D are discharge voltage and current graphs for wireless charging devices with and without regulator circuits.

DETAILED DESCRIPTION

Figure 1:
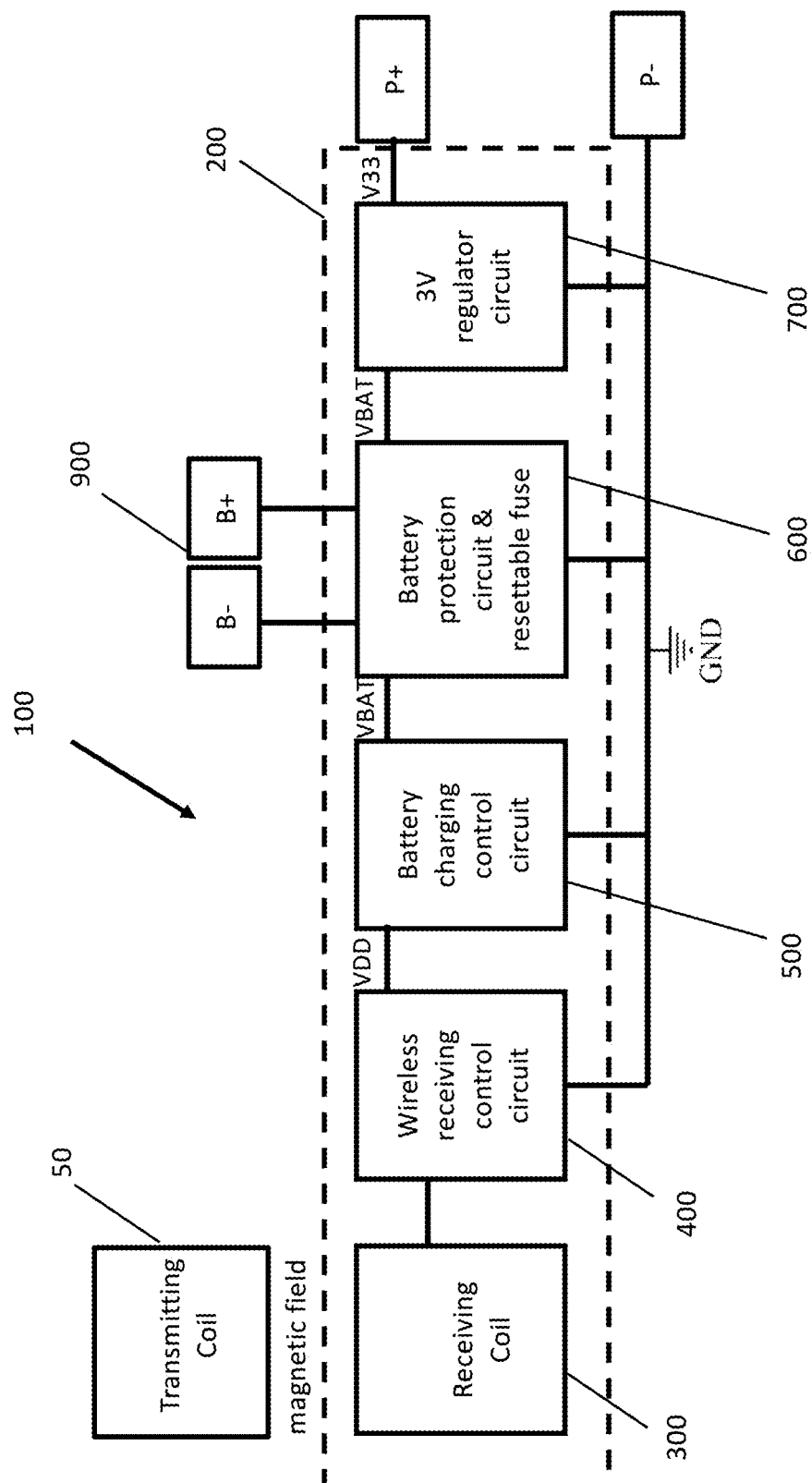
FIG. 1 is a schematic overview of a wireless charging system including a wireless charging device according to an embodiment of the invention.

FIG. 1 depicts a schematic overview of a wireless charging system 100 that includes a transmitting coil 50 that receives power from a power source (not illustrated) and, via a magnetic field, transmits power to a wireless charging device 200. Note that a wide variety of transmitting coils may be used with many being commercially available; element 50 is not part of the claimed invention. The wireless charging device 200 includes a receiving coil 300, a wireless receiving control circuit 400, battery charging control circuit 500, battery protection circuit (with a resettable fuse) 600, and constant voltage regulator circuit 700. B+B−, element 900, indicate a rechargeable battery (e.g., button/coin cell) positive and navigate terminals which the voltage and current are under protected by the battery protection circuit 600. The P+P− conductive pads indicate the system load for which the output voltage is regulated by the regulation circuit 700 at the output stage.

Figure 2:
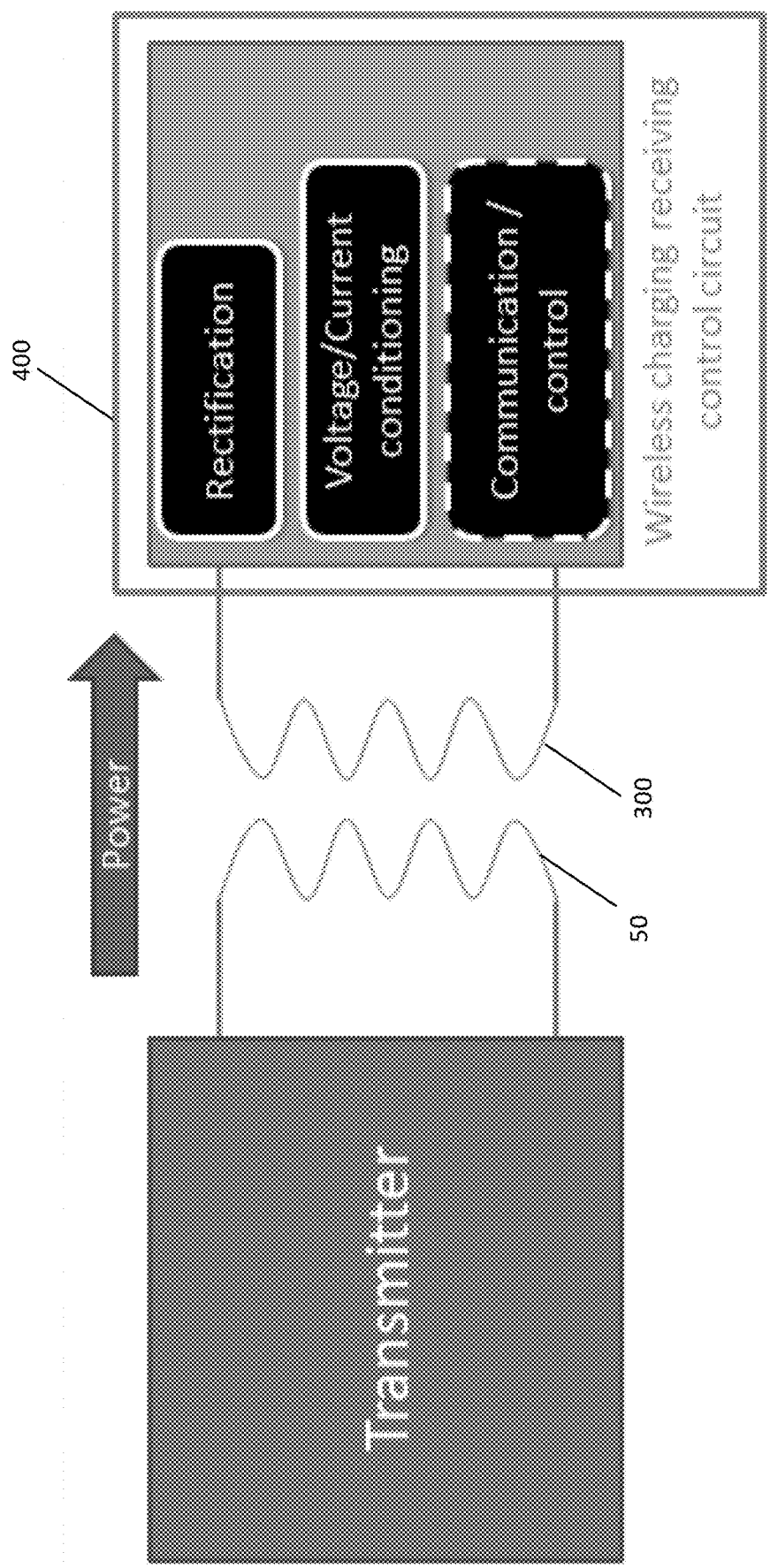
FIG. 2 is an overview of a wireless receiving control circuit used in the wireless charging device of FIG. 1.
Figure 3:
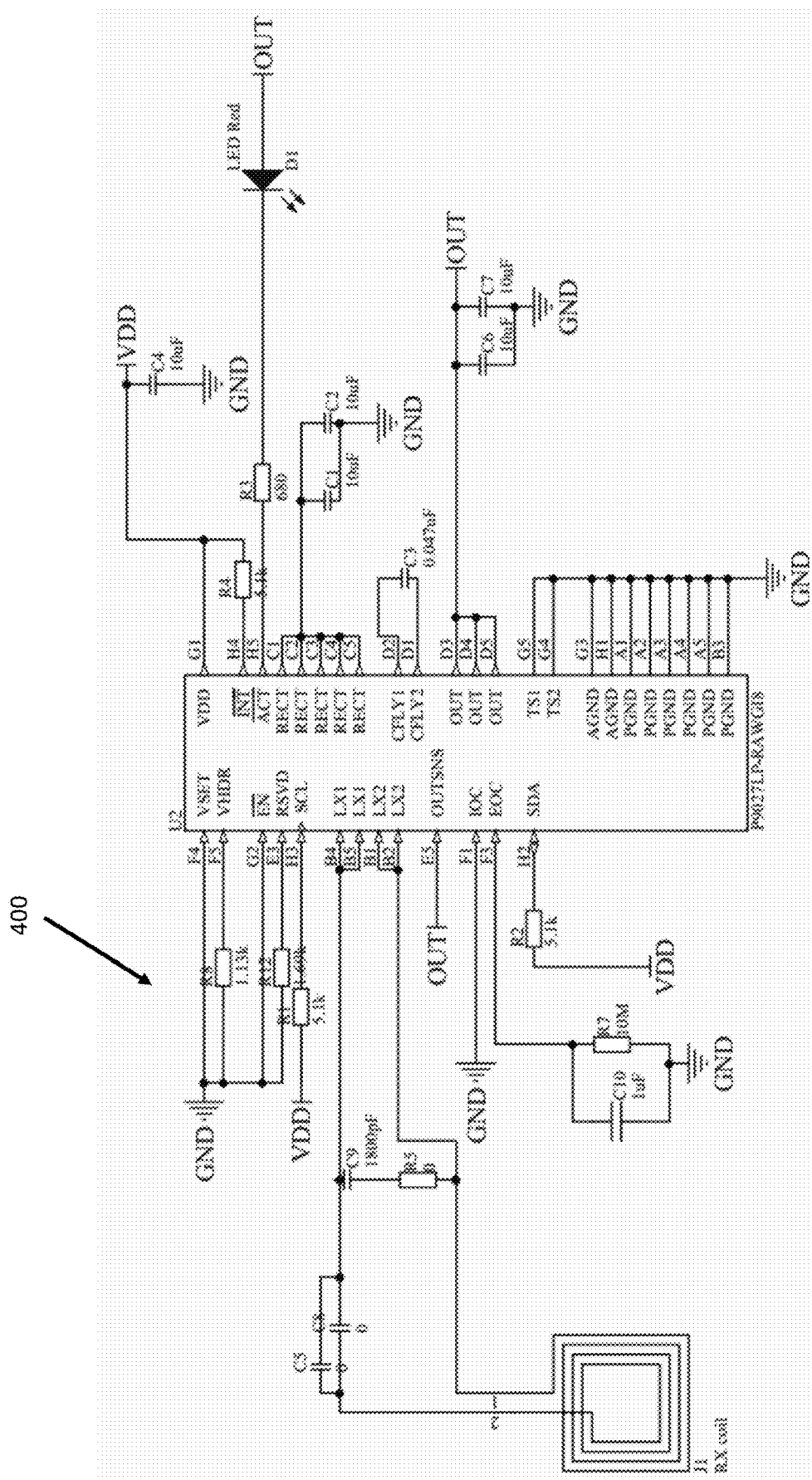
FIG. 3 is an example of a wireless receiving control circuit used in the wireless charging device of FIG. 1.

FIG. 2 presents a functional overview of the wireless receiving control circuit 400. After power is transmitted from transmitting coil 50 to receiving coil 300, it undergoes rectification and voltage/current conditioning. The wireless receiving control circuit 400 further includes communication and control functions. FIG. 3 presents a detailed wiring diagram of an example of a wireless receiving control circuit 400 that includes the functions depicted in FIG. 2.

Figure 4:
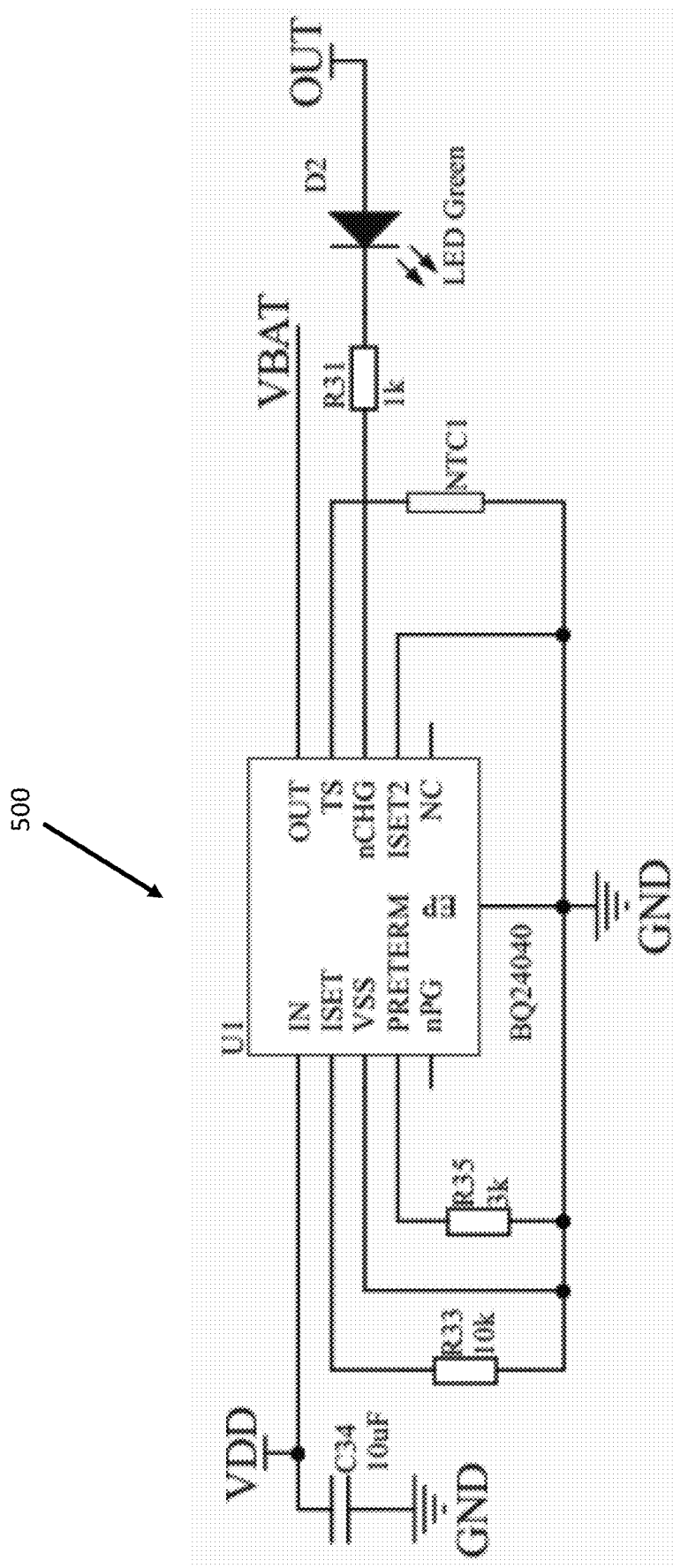
FIG. 4 is an example of a battery charging circuit used in the wireless charging device of FIG. 1.

FIG. 4 presents a detailed wiring diagram of an example of a battery charging control circuit 500. The battery charging control circuit regulates the voltage and current coming from the wireless receiving control circuit (indicated as VDD in FIG. 2) and outputs the regulated voltage and current as VBAT (FIG. to the battery protection circuit 600.

Figure 5:
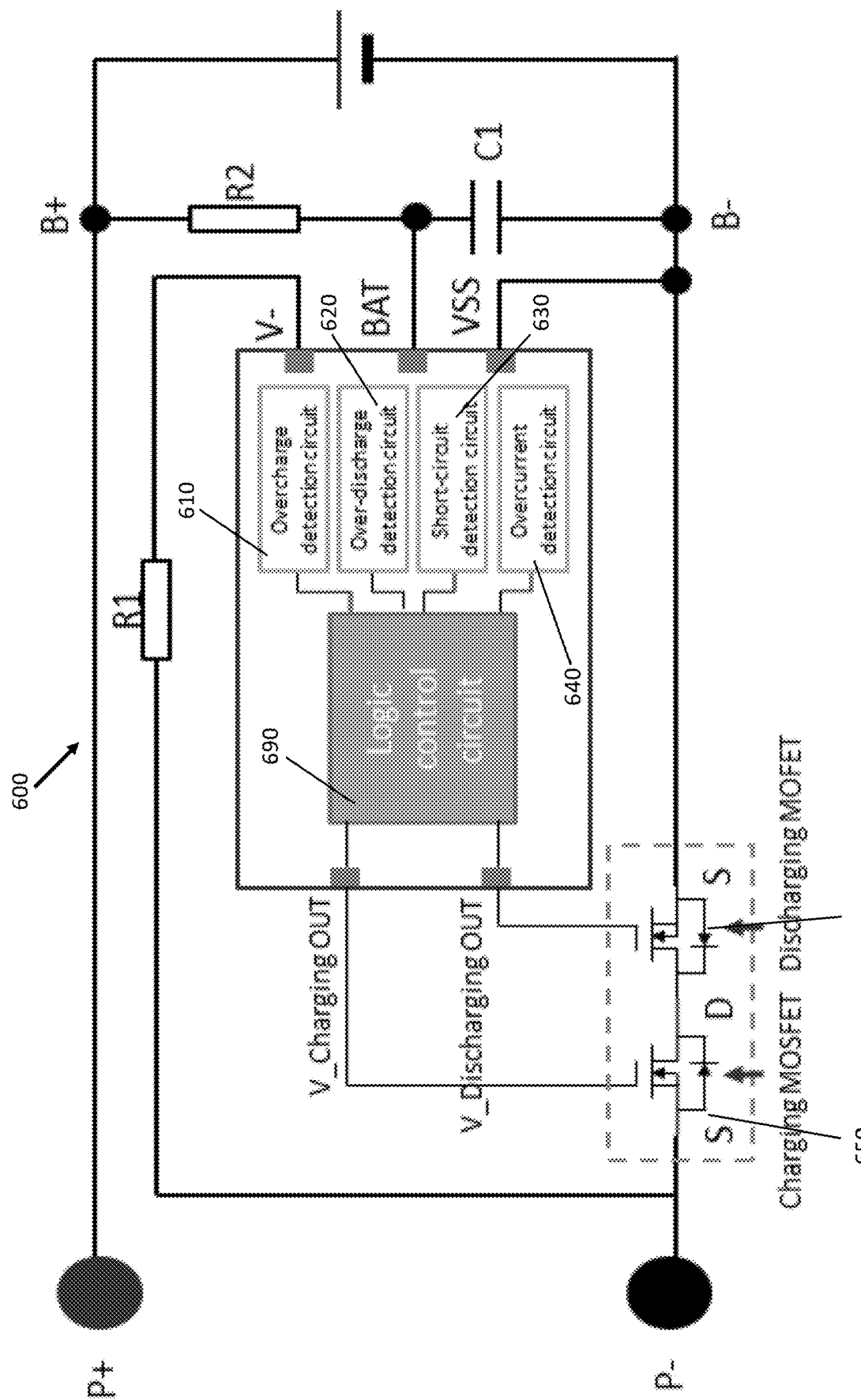
FIG. 5 is an overview of a battery protection circuit used in the wireless charging device of FIG. 1.

FIG. 5 depicts an overview of a battery protection circuit 600. The battery protection circuit 600 includes a logic control circuit 690, an overcharge detection circuit 610, an over-discharge detection circuit 620, an overcurrent detection circuit 640, a short-circuit detection circuit 630 and two MOSFETs, 650 (charging MOSFET), 660 (discharging MOSFET). The protection circuit 600 connects to a battery via connective pads B+B− and to the system load at P+P− to continuously monitor the battery (button cell/coin cell) and system load status. If any fault such as overcharge, over-discharge, overcurrent or short-circuit is detected, the logic control circuit 690 will control the MOSFET turn-off and disconnect the battery and system load.

Figure 6:
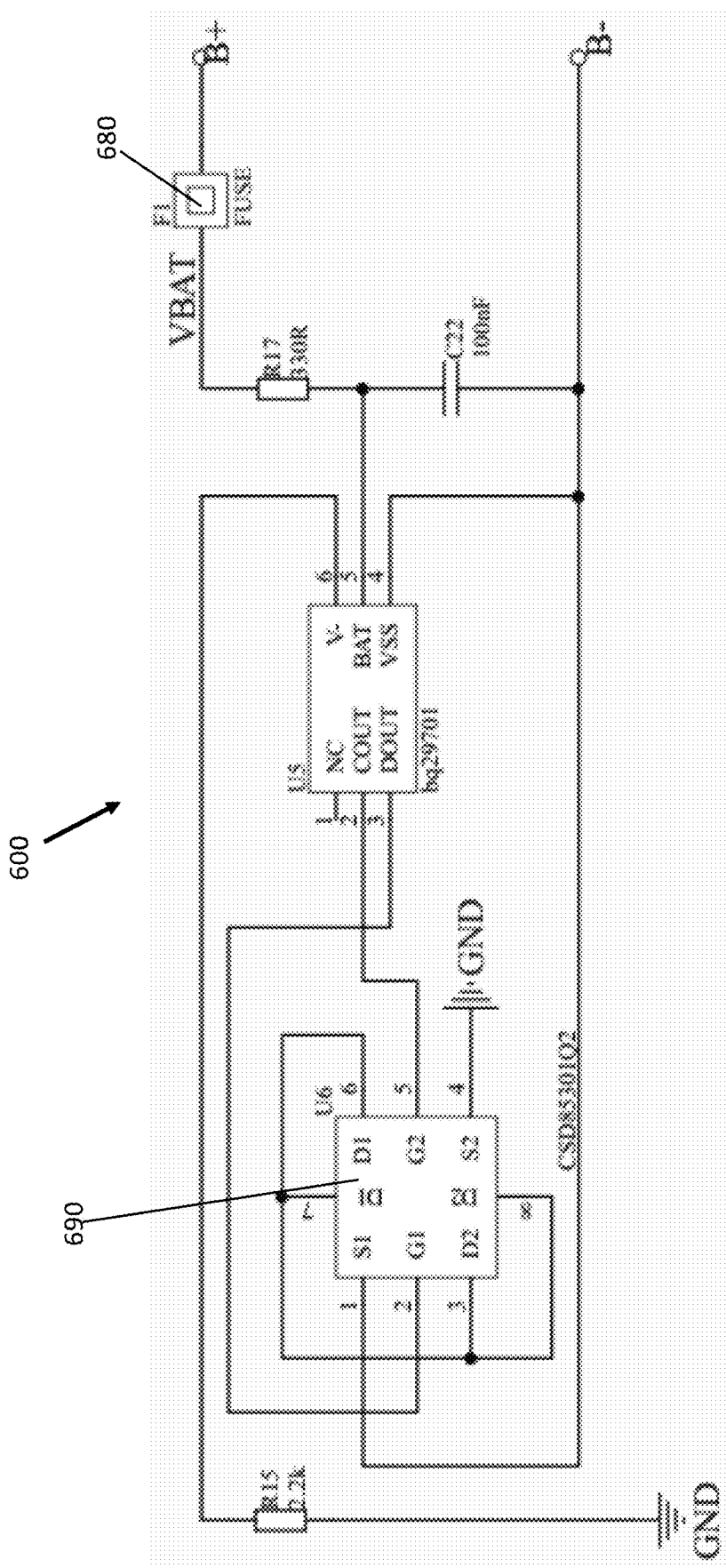
FIG. 6 is an example of a battery protection circuit used in the wireless charging device of FIG. 1.

FIG. 6 is a further example of a battery protection circuit 600. In the circuit of FIG. 6, a resettable fuse 680 is also included in the battery protection circuit 600 as a second battery protection mechanism. The resettable fuse 680 is positioned between positive pads of the button cell and the system load. If the current flowing though the resettable fuse is higher than the protection current, the resettable fuse will increase resistance as temperature increases, preventing overcharging.

Figure 7:
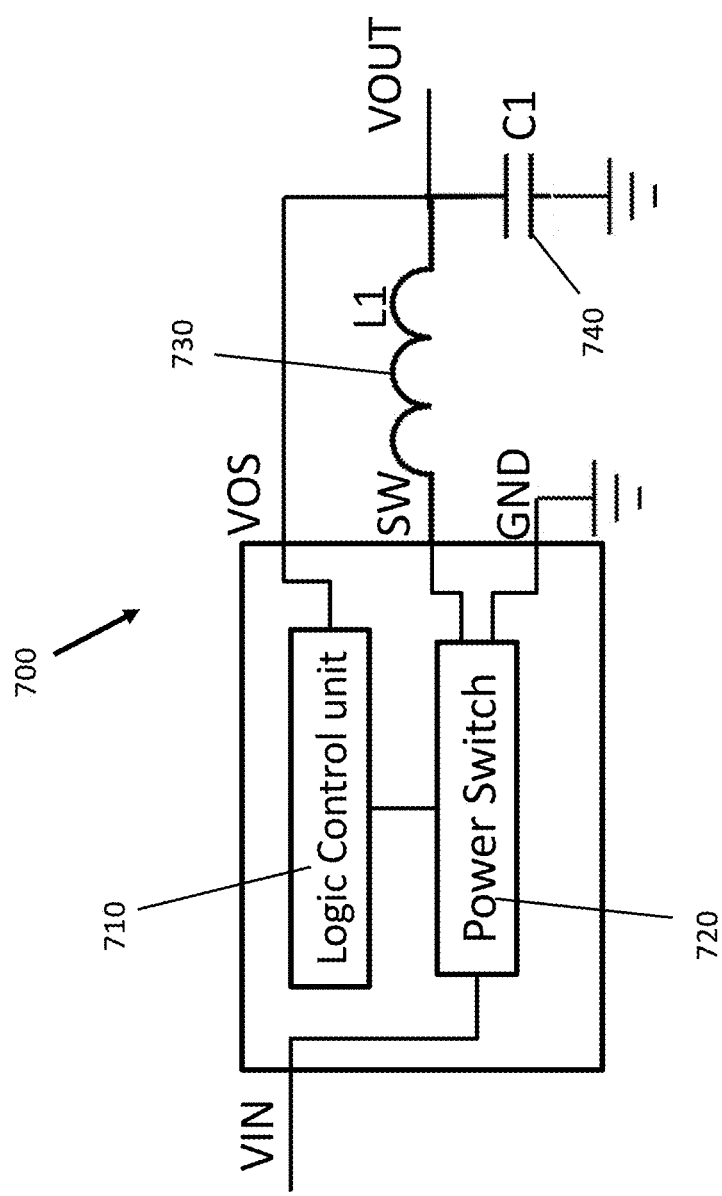
FIG. 7 is an overview of a voltage regulator circuit used in the wireless charging device of FIG. 1.

FIG. 7 is an example of the voltage regulator circuit 700 of FIG. 2. The voltage regulator circuit comprise of logic control unit 710, power switch 720, power inductor 730 and a capacitor 740. The power inductor 730 functions as an energy storage element in the circuit, connected between the power switch and output ("VOUT"). The power switch 720 is connected to the power inductor and also the power input ("VIN") and ground. The logic control unit 710 will control the power switch ON/OFF setting according to the feedback voltage (VOS) from the output voltage. The capacitor 740 reduces the voltage ripple generated from charging and discharging the power inductor 730.

The battery/button cell 900 connected with the battery protection circuit 600 is connected to the voltage input of the regulator circuit 700. When the button cell voltage is higher than 3V, the voltage regulator circuit 700 will enable and transform the voltage to 3V from the button cell. The logic control unit 710 will generate a high frequency ON/OFF control signal to the power switch 720, thus the power switch will connect the power inductor to the voltage input ("VIN") and to ground alternately. If the inductor is connected to the voltage input, the voltage will charge the inductor 730. If the inductor 730 is connected to ground, the inductor will be discharged. The logic control unit 710 will keep detecting the output voltage and will maintain the output voltage by adjusting the weight of ON time to OFF time of the control signal. If the output voltage detected is less than 3V, the logic control unit 710 will increase the inductor charging time by increasing the ON-time of the control signal. If the output voltage is greater than 3V, the logic control unit 710 will increase the inductor discharge time by increasing the OFF-time of the control signal. Through this control by the logic control unit 710, a stable voltage ("VOUT") may be achieved.

Figure 8:
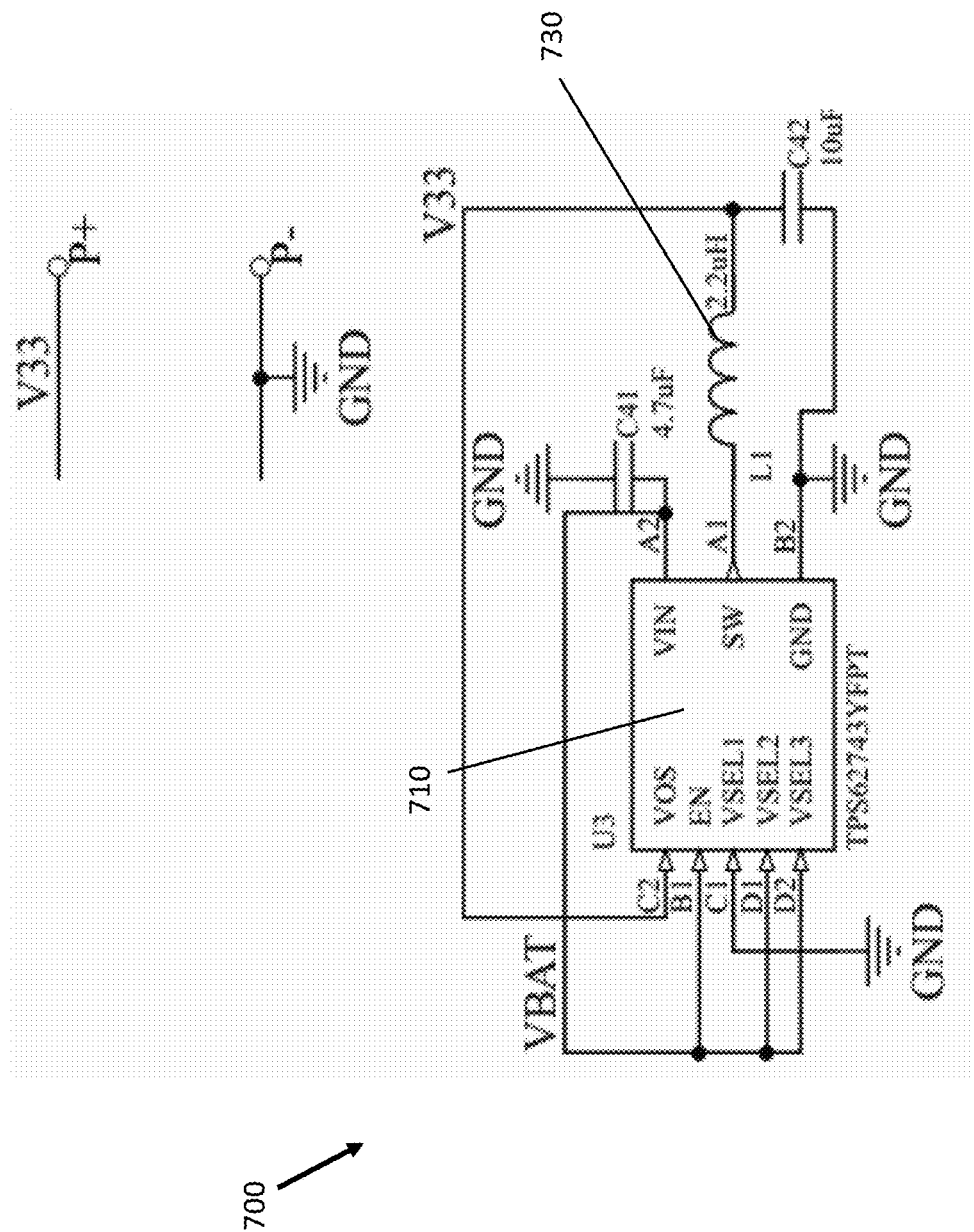
FIG. 8 is an example of a voltage regulator circuit used in the wireless charging device of FIG. 1.

FIG. 8 presents a detailed wiring diagram of an example of a voltage regulator circuit 700 of FIG. 2. The logic control unit 710 and the inductor 730 are indicated in circuit 700. It is understood that other implementations of all of the various example circuits may be used in the wireless charging device of the present invention. The combination of 710 and 730 forms a buck converter for stepping down voltage from an input to a load.

FIGS. 9A, 9B, and 9C depict the fabrication and structure of metal traces used in the circuits of the wireless charging device of the present invention. FIG. 9A shows an additive process to deposit a copper layer 14 on a substrate 10. In such a process, copper is deposited to define circuit elements, for example, using masks to define patterns. FIG. 9B shows a subtractive process to deposit a copper layer in which a layer of copper is deposited followed by etching to define circuit elements. FIG. 9C shows a multilayer structure formed (using either the technique of FIG. 9A or 9B) in which a copper layer 12 is positioned on both sides of substrate 10. Adhesive layers 14 are positioned over each of the copper layers 12 followed by cover/protective layers 16.

The substrate layer and cover layers may be thin sheets of polyimide (PI), polyether ether ketone (PEEK) or transparent conductive polyester films. The cover layers protect the metal traces from mechanical damage or oxidation.

Figures 10A, 10B, 10C:
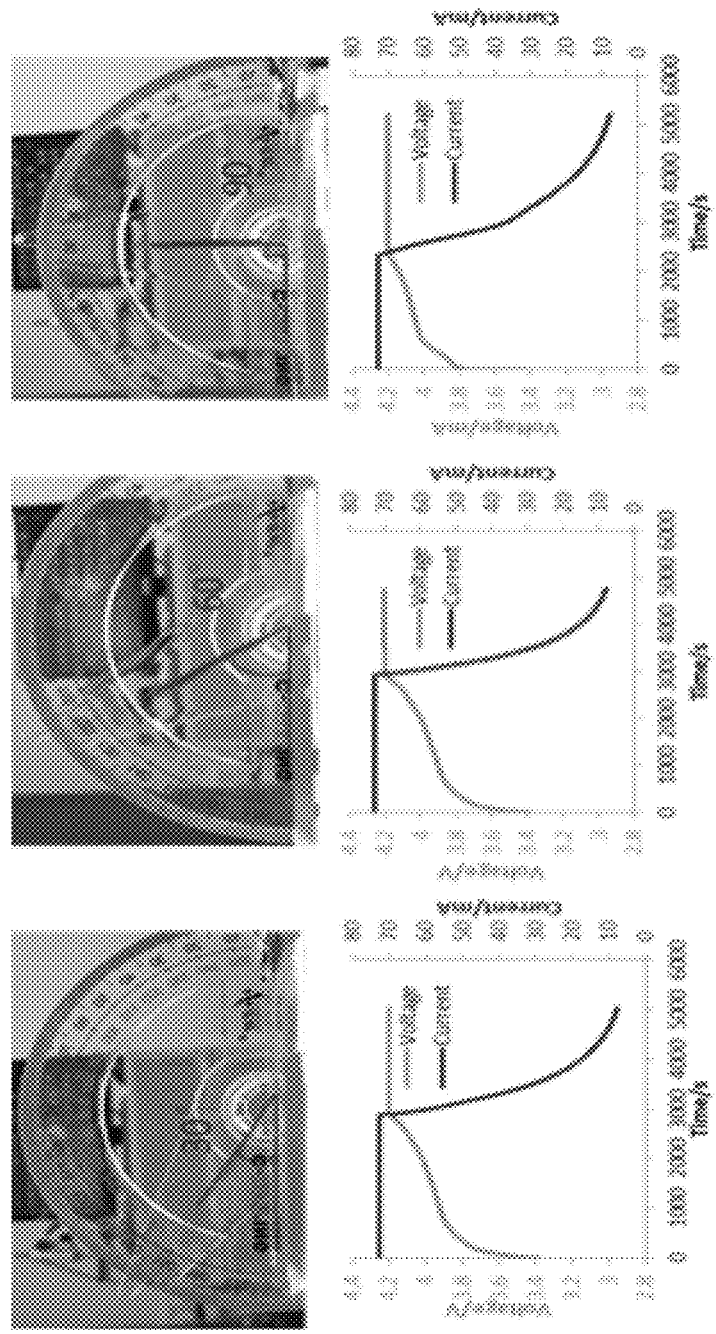
FIGS. 10A-10C are charging profiles of bendable wireless charging devices at 30, 60, and 90 degree bending angles.

The wireless charging device of the present invention may be implemented in a variety of form factors. Typically, these form factors will be determined by the configuration of the device powered by the batteries that are wirelessly charged. For example, two commercial implementations of wireless charging, mobile telephones and cordless electric toothbrushes, implement wireless charging in very different configurations. Due to the different form factors of the final product, the wireless charging device of the present invention is bendable up to an angle of 90 degrees in order to permit its incorporation into various housing shapes or incorporation into flexible, wearable electronic devices. FIGS. 10A, 10B, and 10C show wireless charging devices of the present invention tested at bending angles of 30, 60, and 90 degrees, respectively. As seen in the corresponding charging profiles (1 C) of a rechargeable lithium ion battery with a capacity of 70 mAh charged by the bendable wireless charging device of the present invention, the wireless charging device is operational at all three bending angles with no reduction in function. The flexible wireless charging devices may be coupled with flexible transmitting coils to produce custom and complementary transmitting/receiving coil configurations for portable electronics.

A rechargeable portable electronic device will typically include the wireless charging device of the present invention along with a rechargeable battery. In such a device, the charging portion 200 is positioned away from the inductor portion, 300 in order to position the battery away from the inductor magnetic field. This is to prevent heating of the metal casing due to the magnetic field. Typically, a pair of conductive pads will be provided for electrical connection to the rechargeable button cell and a pair of conductive pads will be provided for electrical connection to a load.

Figure 11:
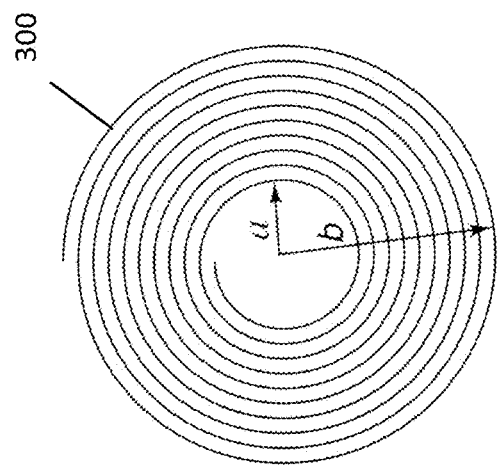
FIG. 11 depicts a size mismatch between a transmitting coil and a receiving coil.
Figure 11:
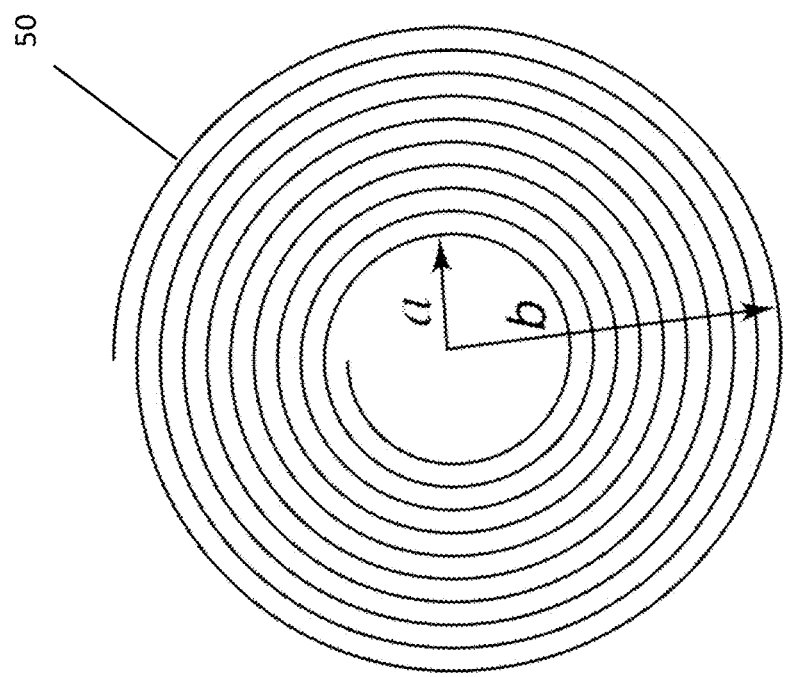

Advantageously, the wireless charging device of the present invention can operate with a size mismatch between the transmitting coil 50 and the receiving coil 300. In this way, the wireless charging device of the present invention can be compatible with a commercial transmitting inductor coil 50 size that is typically larger than the receiving coil size 300 in the inventive wireless charging device. For example, FIG. 11 depicts a transmitting coil 50 (left) and a receiving coil 300 (right). The outer diameter of the coils is labeled "b" in FIG. 11. The wireless charger receiving coil on the right has a diameter "b" that is less than approximately 80 percent of the diameter of the transmitting inductor coil on the left. In some cases, the diameter of the receiving coil may be approximately 60 percent of the transmitting coil. In general, the diameter of the receiving coil may be less than 100 percent of the size of the transmitting coil down to about 60 percent of the transmitting coil. That is, $b_{transmitting} > b_{receiving} \geq 0.6\, b_{transmitting}$.

Figures 12A, 12B:
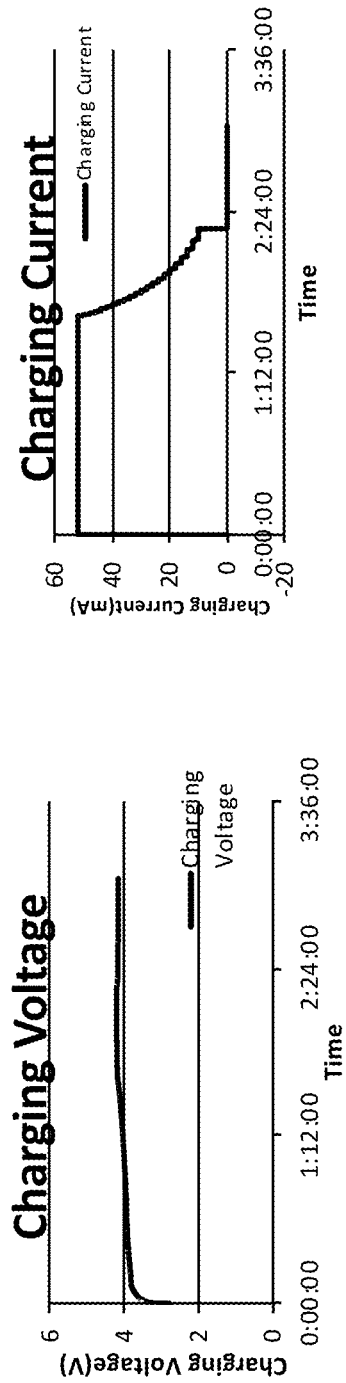
FIG. 12A-12B are graphs of the charging voltage and charging current of the wireless charging device of FIG. 1.

FIGS. 12A and 12B are the charging voltage and current profiles of a 1654 rechargeable button cell charged by the small form factor wireless charging device of the present invention in 54 mA (>0.5 C) charging current. FIG. 12A shows the charging voltage curve of the 1654 rechargeable button cell charging from 2.5 V to 4.2 V during the charging process. FIG. 12B depicts the charging current curve of the 1654 rechargeable button cell where the charging current is 54 mA in constant current mode and drops to 8 mA in constant voltage mode.

FIGS. 13A-13D are the discharging profiles of a 1654 rechargeable button cell and the small form factor wireless charging device when connected to a 48-50 mA load. In FIG. 13A the upper curve is a 1654 button cell discharge voltage before the regulator input. The lower curve shows that the voltage is a stable voltage unless the cell voltage is dropping during the loading test. FIG. 13B shows an output current set as 48-50 mA in this test in the upper curve. The lower curve shows that the 1654 button cell discharge current is less than load current. In FIG. 13C, the curve shows the button cell discharge profile file without a regulator circuit. Without a regulator circuit, the voltage output drops from 4.2 to 3 V which is not suitable for an external electronic circuit. FIG. 13D depicts the discharge current set as 50 mA in the test. The total use time for the device with a regulator circuit vs. the device without a regulator circuit (in the same load current) is 2:09:52 and 1:28:40, respectively. Therefore, the device with a regulator circuit has a time increased by approximately 40 minutes over the time for a device without a regulator circuit.

In one aspect, the present invention provides a wireless charging device for a button/coin cell rechargeable lithium ion battery, the battery having a size of approximately 5 mm diameter to approximately 25 mm diameter, with a thickness of approximately 1 mm to approximately 6 mm. The wireless charging device includes a flexible inductor receiving coil for receiving energy from an inductor transmitting coil, wherein the flexible and substantially planar inductor receiving coil is bendable up to an angle of approximately 90 degrees during wireless charging of the button/coin cell rechargeable lithium ion battery and wherein the flexible inductor receiving coil is less than the diameter of the inductor transmitting coil and greater than or equal to 0.6 the diameter of the inductor transmitting coil.

A wireless charging receiving circuit includes, a charging control circuit, a voltage regulation circuit, and a battery protection circuit in electrical communication with one another, the wireless charging receiving circuit being in electrical communication with the receiving inductor coil. The voltage regulation circuit includes a 1.8 V-3.3 V constant voltage output regulator circuit to maintain a constant voltage output in loading currents ranging from approximately 10 µA to approximately 300 mA.

In another aspect, the present invention provides a charging device as described above, wherein a size of the receiving coil is from approximately 80 mm$^2$ to approximately 2000 mm$^2$.

In another aspect, the present invention provides a charging device as described above, wherein the receiving inductor coil includes a metal layer on a flexible polymer substrate with a flexible polymer cover layer, wherein the metal layer has a thickness in a range of approximately 5 to approximately 100 um and wherein the thickness of the flexible polymer substrate and the polymer cover layer is in the range of approximately 2 to approximately 100 microns.

In another aspect, the present invention provides a charging device as described above, wherein the charging device includes a circuit board area having a size from approximately 80 mm$^2$ to approximately 2000 mm$^2$.

In another aspect, the present invention provides a charging device as described above, wherein the constant voltage output regulator circuit includes a buck converter.

In another aspect, the present invention provides a charging device as described above, further comprising a resettable fuse to limit the charge current and discharge current of the button/coin cell to within 500 mA.

In another aspect, the present invention provides a charging device as described above, wherein the battery protection circuit includes an overcharging voltage protection circuit, an overcharging current protection circuit, an under-discharging voltage protection circuit, an under-discharging current protection circuit, and a short-circuit protection circuit wherein at least two of the protection switches are connected in serial with one another.

In another aspect, the present invention provides a charging device as described above, further comprising a pair of conductive pads for electrical connection to the rechargeable button cell and a pair of conductive pads for electrical connection to a load.

In another aspect, the present invention provides a charging device as described above, wherein the protection switches of the battery protection circuit comprise N-channel MOSFETs.

In another aspect, the present invention provides a charging device as described above, wherein over voltage range during charging between a negative and positive terminal of the rechargeable button/coin cell is between approximately 3.5 to approximately 5 V.

In another aspect, the present invention provides a charging device as described above, wherein the range of under voltage during discharging between a negative and positive terminal of the rechargeable button cell is between approximately 2 to approximately 3 V.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A wireless charging device for a button/coin cell rechargeable lithium ion battery, the battery having a size of approximately 5 mm diameter to approximately 25 mm diameter, with a thickness of approximately 1 mm to approximately 6 mm, the wireless charging device comprising:
a flexible and planar spiral inductor receiving coil for receiving energy from an inductor transmitting coil, wherein the flexible and planar spiral inductor receiving coil is bendable up to an angle of approximately 90 degrees during wireless charging of the button/coin cell rechargeable lithium ion battery and wherein diameter of the flexible and planar spiral inductor receiving coil is less than the diameter of the inductor transmitting coil and greater than or equal to 0.6 the diameter of the inductor transmitting coil;
a wireless charging receiving circuit, a charging control circuit, a voltage regulation circuit, and a battery protection circuit in electrical communication with one another, the protection circuit connecting to the battery and to a system load to continuously monitor the battery and system load status such that if any fault is detected, the battery is disconnected;
the wireless charging receiving circuit being in electrical communication with the receiving inductor coil; wherein the voltage regulation circuit includes a 1.8 V-3.3 V constant voltage output regulator circuit to maintain a constant voltage output in loading currents ranging from approximately 10 μA to approximately 300 mA.

2. The charging device as recited in claim 1, wherein a size of the flexible and planar spiral inductor receiving coil is from approximately 80 mm² to approximately 2000 mm².

3. The charging device as recited in claim 1, wherein the flexible and planar spiral inductor receiving inductor coil includes a metal layer on a flexible polymer substrate with a flexible polymer cover layer, wherein the metal layer has a thickness in a range of approximately 5 to approximately 100 um and wherein a thickness of the flexible polymer substrate and the polymer cover layer is in the range of approximately 2 to approximately 100 microns.

4. The charging device as recited in claim 1, wherein the charging device includes a circuit board area having a size from approximately 80 mm² to approximately 2000 mm².

5. The charging device as recited in claim 1, wherein the constant voltage output regulator circuit includes a buck converter.

6. The charging device as recited in claim 1, further comprising a resettable fuse to limit a charge current and discharge current of the button/coin cell to within 500 mA.

7. The charging device as recited in claim 1, wherein the battery protection circuit includes an overcharging voltage protection circuit, an overcharging current protection circuit, an under-discharging voltage protection circuit, an under-discharging current protection circuit, and a short-circuit protection circuit wherein at least two of the protection switches are connected in serial with one another.

8. The charging device as recited in claim 1, further comprising a pair of conductive pads for electrical connection to the rechargeable button cell and a pair of conductive pads for electrical connection to a load.

9. The charging device as recited in claim 7, wherein the protection switches of the battery protection circuit comprise N-channel MOSFETs.

10. The charging device as recited in claim 7, wherein over voltage range during charging between a negative and positive terminal of the rechargeable button/coin cell is between approximately 3.5 to approximately 5 V.

11. The charging device as recited in claim 7, wherein the range of under voltage during discharging between a negative and positive terminal of the rechargeable button cell is between approximately 2 to approximately 3 V.

* * * * *